US012633287B2

(12) United States Patent
    Dhoolia et al.

(10) Patent No.: US 12,633,287 B2
(45) Date of Patent: May 19, 2026

(54) DOMAIN MODEL DRIVEN PROCESSING OF DIALOG INCLUDING AMBIGUOUS INTENTS

(71) Applicant: INTERNATIONAL BUSINESS MACHINES CORPORATION, Armonk, NY (US)

(72) Inventors: Pankaj Dhoolia, Ghaziabad (IN); Daniel T O'Connor, Milton, MA (US); Venkat Raghavan Ganesh Sekar, Lowell, MA (US); Andrew James Stoneberg, Clarksburg, MD (US); Muhtar Burak Akbulut, Waban, MA (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 18/525,620

(22) Filed: Nov. 30, 2023

(65) Prior Publication Data

US 2025/0182749 A1     Jun. 5, 2025

(51) Int. Cl.
    *G10L 15/22*          (2006.01)
    *G06F 40/30*          (2020.01)
             (Continued)

(52) U.S. Cl.
    CPC .......... *G10L 15/1815* (2013.01); *G06F 40/30* (2020.01); *G06F 40/35* (2020.01);
             (Continued)

(58) Field of Classification Search
    None
    See application file for complete search history.

(56) References Cited

U.S. PATENT DOCUMENTS 7,249,018 B2 *   7/2007   Ross ................... G10L 15/1822
                                                704/E15.044
8,898,140 B2    11/2014   Cooper
                          (Continued)

FOREIGN PATENT DOCUMENTS

AU        2021347371 A1      6/2023
WO         201553861 A2      4/2015

OTHER PUBLICATIONS

Perez-Soler et al., "Model-Driven Chatbot Development", Research Gate, Oct. 2020, 15 pages. https://www.researchgate.net/publication/345905669_Model-Driven_Chatbot_Development.

*Primary Examiner* — Richard Z Zhu
(74) *Attorney, Agent, or Firm* — Tihon Poltavets

(57)         ABSTRACT

An embodiment for domain model driven processing of dialog system inputs including ambiguous intents. The embodiment may receive a dialog system input for processing by a dialog system. The embodiment may identify a series of ambiguous intents within the received dialog system input. The embodiment may, in response to identifying the series of ambiguous intents, determine, based on an accessible domain model, one or more relevant annotated themes corresponding to each individual intent within the series of ambiguous intents. The embodiment may execute, using the dialog system, a dialog corresponding to the received dialog system input by employing a set of generic rules, wherein the set of generic rules leverage the identified relevant annotated themes.

18 Claims, 2 Drawing Sheets

(51) Int. Cl.

| | |
|---|---|
| *G06F 40/35* | (2020.01) |
| *G10L 15/18* | (2013.01) |
| *G10L 15/183* | (2013.01) |
| *G06F 40/237* | (2020.01) |
| *G06F 40/289* | (2020.01) |
| *G06F 40/295* | (2020.01) |

(52) U.S. Cl.
CPC ........ *G10L 15/1822* (2013.01); *G10L 15/183* (2013.01); *G10L 15/22* (2013.01); *G06F 40/237* (2020.01); *G06F 40/289* (2020.01); *G06F 40/295* (2020.01); *G10L 2015/223* (2013.01); *G10L 2015/225* (2013.01)

(56) References Cited

U.S. PATENT DOCUMENTS

| | | | | |
|---|---|---|---|---|
| 9,262,528 | B2 | 2/2016 | Cooper | |
| 9,454,960 | B2 | 9/2016 | Stewart | |
| 9,911,413 | B1 * | 3/2018 | Kumar | G06F 40/169 |
| 9,922,642 | B2 * | 3/2018 | Pitschel | G10L 15/063 |
| 10,079,013 | B2 * | 9/2018 | Kalns | G10L 15/1822 |
| 10,725,836 | B2 | 7/2020 | Savenkov | |
| 10,796,100 | B2 * | 10/2020 | Bangalore | G06F 16/3329 |
| 10,817,578 | B2 | 10/2020 | Mandal | |
| 10,832,659 | B2 | 11/2020 | Ho | |
| 10,930,278 | B2 * | 2/2021 | Barbello | G06F 3/167 |
| 11,380,306 | B2 | 7/2022 | Mallinar | |
| 11,393,475 | B1 | 7/2022 | Aili | |
| 11,455,981 | B2 | 9/2022 | Amid | |
| 11,531,821 | B2 * | 12/2022 | Xie | H04L 51/02 |
| 11,568,855 | B2 * | 1/2023 | Zhao | G10L 15/063 |
| 11,705,114 | B1 * | 7/2023 | Marzinzik | G10L 15/22 |
| | | | | 704/235 |
| 11,922,123 | B2 * | 3/2024 | Vishnoi | G06F 16/3329 |
| 12,019,984 | B2 * | 6/2024 | Bhagavath | G10L 15/22 |
| 12,400,643 | B2 * | 8/2025 | Marzinzik | G06F 40/35 |
| 12,444,411 | B1 * | 10/2025 | Derezhenets | G10L 15/1822 |
| 2015/0039292 | A1 * | 2/2015 | Suleman | G06F 16/245 |
| | | | | 704/9 |
| 2016/0117360 | A1 * | 4/2016 | Kunc | G06F 16/3329 |
| | | | | 707/730 |
| 2017/0091629 | A1 * | 3/2017 | Li | G06N 20/00 |
| 2018/0174578 | A1 * | 6/2018 | Bangalore | G06F 40/137 |
| 2019/0228068 | A1 * | 7/2019 | Sen | G06F 40/295 |
| 2020/0160861 | A1 * | 5/2020 | Lee | G10L 15/22 |
| 2021/0027785 | A1 * | 1/2021 | Kahan | G06F 16/433 |
| 2022/0100961 | A1 * | 3/2022 | Vishnoi | G06F 40/35 |
| 2023/0074406 | A1 * | 3/2023 | Baeuml | G06F 16/90332 |
| 2024/0282296 | A1 * | 8/2024 | Bhathena | G06F 40/58 |
| 2024/0411988 | A1 * | 12/2024 | Ritchie | G06F 40/226 |

* cited by examiner

200

START

Receive dialog system input. 202

Identify series of ambiguous intents within the dialog system input. 204

Determine relevant annotated themes for each individual intent based on an accessible domain model. 206

Execute a dialog for the received dialog system input using a set of generic rules that leverage the relevant annotated themes. 208

END

DOMAIN MODEL DRIVEN PROCESSING OF DIALOG INCLUDING AMBIGUOUS INTENTS

BACKGROUND

The present application relates generally to computer processing, and more particularly, to domain model driven processing of dialog system inputs including ambiguous intents.

Dialog systems, notably chatbots, are increasingly employed by businesses due to their ability to provide for continuous availability and support at any time of day. Dialog systems may streamline communication processes, saving time for both businesses and users. When dialog systems are correctly employed, businesses often observe improved customer satisfaction and enhanced operational efficiency. Thus, businesses constantly strive to employ dialog systems having increased versatility and efficiency with respect to their ability to handle increasing complex user inputs.

SUMMARY

According to one embodiment, a method, computer system, and computer program product for domain model driven processing of dialog system inputs including ambiguous intents is provided. The embodiment may include receiving a dialog system input for processing by a dialog system. The embodiment may also include identifying a series of ambiguous intents within the received dialog system input. The embodiment may further include, in response to identifying the series of ambiguous intents, determining, based on an accessible domain model, one or more relevant annotated themes corresponding to each individual intent within the series of ambiguous intents. The embodiment may also include executing, using the dialog system, a dialog corresponding to the received dialog system input by employing a set of generic rules, wherein the set of generic rules leverage the identified relevant annotated themes.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
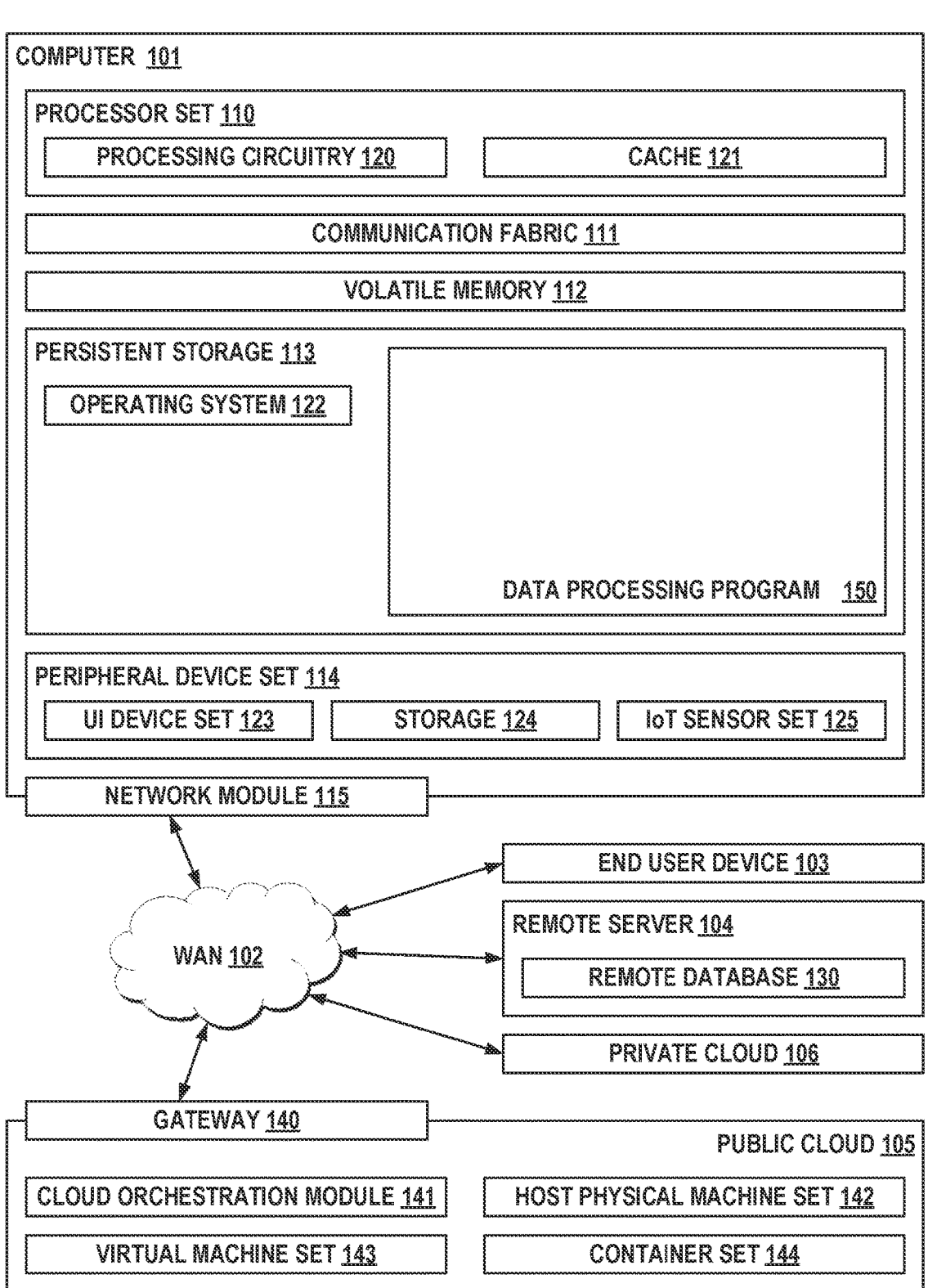
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computer processing, and more particularly, to domain model driven processing of dialog system inputs including ambiguous intents. The following described exemplary embodiments provide a system, method, and program product to, among other things, receive a dialog system input for processing by a dialog system, identify a series of ambiguous intents within the received dialog system input, in response to identifying the series of ambiguous intents, determine, based on an accessible domain model, one or more relevant annotated themes corresponding to each individual intent within the series of ambiguous intents, and execute, using the dialog system, a dialog corresponding to the received dialog system input by employing a set of generic rules, wherein the set of generic rules leverage the identified relevant annotated themes.

As previously described, dialog systems, notably chatbots, are increasingly employed by businesses due to their ability to provide for continuous availability and support at any time of day. Dialog systems may streamline communication processes, saving time for both businesses and users. When dialog systems are correctly employed, businesses often observe improved customer satisfaction and enhanced operational efficiency. Thus, businesses constantly strive to employ dialog systems having increased versatility and efficiency with respect to their ability to handle increasing complex user inputs.

However, many dialog systems are unable to efficiently support dialogs generated in response to dialog system inputs having certain features. For example, many dialog systems do not support dialogs that involve multiple ambiguous intent use cases within a received input or prompt. Typically, digression and disambiguation of dialog system inputs involving multiple ambiguous intents would require brittle rule-based configurations forcing conversation designers to manage large numbers of granular rules. For example, conversation designers may have to manually build rules for how a dialog system should prioritize amongst multiple intentions, rules for which intents the dialog system should remember and how to track the multiple intents to conclusion, rules for preventing the dialog system from disambiguating or digressing inappropriately and describing the right subset of intents to service, rules that hard code recommendations for meaningful follow-up conversations, node or topic-level rules to determine when to disambiguate and when to digress, and a wide variety of other rules required to allow a dialog system to have the versatility and efficiency required to generate dialog for dialog system inputs including multiple ambiguous intents. Thus, improved methods of domain model driven processing of dialog system inputs including ambiguous intents would be advantageous for businesses seeking to employ dialog systems that are more efficient and versatile, while avoiding the need to invest time and capital into manually creating and managing a large number of granular rules and relationships.

Accordingly, a method, computer system, and computer program product for domain model driven processing of dialog system inputs including ambiguous intents is provided. The method, system, and computer program product may receive a dialog system input for processing by a dialog system. The method, system, computer program product may identify a series of ambiguous intents within the received dialog system input. The method, system, computer program product may then, in response to identifying the series of ambiguous intents, determine, based on an accessible domain model, one or more relevant annotated themes corresponding to each individual intent within the series of ambiguous intents. Thereafter, the method, system, computer program product may execute, using the dialog system, a dialog corresponding to the received dialog system input by employing a set of generic rules, wherein the set of generic rules leverage the identified relevant annotated themes. In turn, the method, system, computer program product has provided for improved domain model driven processing of dialog system inputs including ambiguous intents. Described embodiments leverage domain models of the intents to empower sets of generic rules that may functionally guide a given dialog system to generate improved conversation experiences for customers by simplifying decisions about disambiguation, digression, and recommending of follow-up conversations in response to receiving dialog system inputs including multiple or linked intents. The themes within the domain model may include relationships, features, dependencies, co-occurrences, and other useful data associated with intents sharing a theme. This allows described embodiments to provide for additional versatility by providing for dialog systems that may engage in generating dialog including recommended follow-up questions while continuously storing conversational data to improve the accuracy and efficiency of the leveraged themes within the domain model. By identifying themes within an accessible domain model that correspond to multiple ambiguous intents of a given dialog system input, described embodiments thus allow for dialog systems that do not require large amounts of granular rules for handling multiple intents, but can instead leverage a simple, and more universal set of generic rules.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as data processing program/code 150. In addition to data processing code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data processing code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data processing code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in data processing program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the data processing program 150 may be a program capable of receiving a dialog system input for processing by a dialog system. Data processing program 150 may then identify a series of ambiguous intents within the received dialog system input. Next, data processing program 150 may, in response to identifying the series of ambiguous intents, determine, based on an accessible domain model, one or more relevant annotated themes corresponding to each individual intent within the series of ambiguous intents. Thereafter, data processing program 150 may execute, using the dialog system, a dialog corresponding to the received dialog system input by employing a set of generic rules, wherein the set of generic rules leverage the identified relevant annotated themes. In turn, data processing program 150 has provided for improved domain model driven processing of dialog system inputs including ambiguous intents. Described embodiments leverage domain models of the intents to empower sets of generic rules that may functionally guide a given dialog system to generate improved conversation experiences for customers by simplifying decisions about disambiguation, digression, and recommending of follow-up conversations in response to receiving dialog system inputs including multiple or linked intents. The themes within the domain model may include relationships, features, dependencies, co-occurrences, and other useful data associated with intents sharing a theme. This allows described embodiments to provide for additional versatility by providing for dialog systems that may engage in generating dialog including recommended follow-up questions while continuously storing conversational data to improve the accuracy and efficiency of the leveraged themes within the domain model. By identifying themes within an accessible domain model that correspond to multiple ambiguous intents of a given dialog system input, described embodiments thus allow for dialog systems that do not require large amounts of granular rules for handling multiple intents, but can instead leverage a simple, and more universal set of generic rules.

Figure 2:
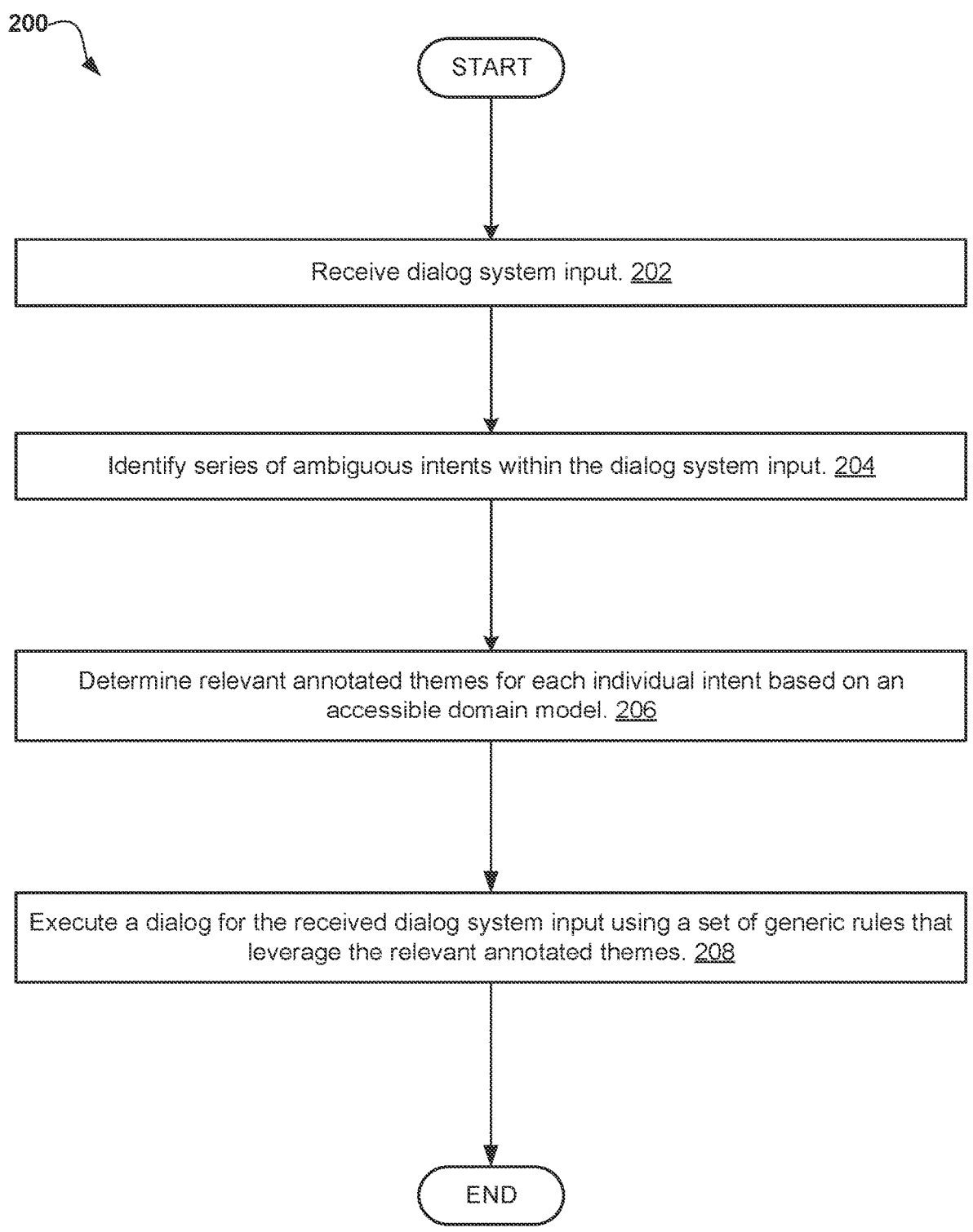
FIG. 2 illustrates an operational flowchart for an exemplary process of domain model driven processing of dialog system inputs including ambiguous intents according to at least one embodiment.

Referring now to FIG. 2, an operational flowchart for an illustrative process 200 of domain model driven processing of dialog system inputs including ambiguous intents according to at least one embodiment is provided.

At 202, data processing program 150 may receive a dialog system input for processing by a dialog system. Data processing program 150 may be employed with any suitable known dialog systems capable of receiving dialog system input. In the context of this disclosure, a dialog system may refer to any system or software that leverages natural language processing to understand and respond to user inputs in a conversational manner. This may include, for example, chatbots, virtual agents, and other algorithm or machine-learning driven software tools for generating dialog in response to received dialog system input. In the context of this disclosure dialog system input may refer to any input received by the dialog system for processing into dialog. The dialog system with which data processing program 150 is being employed may forward or share the received dialog system input with data processing program 150 using any suitable known methods. In embodiments, the dialog system input may be received from a user, and may contain any suitable known forms natural language, such as, for example, textual communication, spoken language or utterances, non-verbal communications that may be converted into associated textual communications, and any other suitable known forms of communication that may be input into a dialog system as a natural language prompt or input for processing into a dialog. For example, at this step, data processing program 150 may be employed with an exemplary dialog system 'D1' and may receive from exemplary dialog system 'D1' an exemplary dialog system input 'Input 1' that includes a spoken statement (utterance) stating "I would like a flight to Boston, and a place to stay. And how do I go about resetting my password for this site?".

At 204, data processing program 150 may then identify a series of ambiguous intents within the received dialog system input. In the context of this disclosure, the series of ambiguous intents may include multiple intents contained within a singular dialog system input which may be interpreted in multiple ways, leading to uncertainty about the intended meaning or purpose behind the received dialog system input. In some embodiments, the series of ambiguous intents may simply include multiple intents which create ambiguity with respect to how the intents should be prioritized during dialog generation. In other embodiments, the ambiguous intents may result from the use of vague language, incomplete information, or multiple potential interpretations of the received dialog system input. In embodiments, the series of ambiguous intents may result from a dialog system input involving polysemy, homophones or homonyms within a spoken or uttered dialog system input, lack of context, ambiguous phrasing, sarcasm, or a variety of other factors.

Returning to the example above, at this step, data processing program 150 may identify a series of ambiguous intents within the exemplary dialog system input 'Input 1' that includes the spoken statement (utterance) stating "I would like a flight to Boston, and a place to stay. And how do I go about resetting my password for this site?" The three individual intents identified by data processing program 150 within this statement may include, for example, 'purchase flight', 'purchase hotel' and 'reset password'. Data processing program 150 may be configured to leverage suitable known natural language processing (NLP) techniques, such as for example, context analysis, entity recognition, and sentiment analysis, and any other useful NLP techniques to identify the individual intents. In the above-example including three individual intents in the series of identified ambiguous intents, a typical dialog system may require a large number of granular rules to identify how to respond to the user for each of the three separate intents in order for the dialog system to be able to efficiently determine how it should prioritize among the multiple intents, which intents the system should remember and track to conclusion, how to appropriate disambiguate or digress, as what recommendations should be provided for meaningful follow-up conversation. For example, a typical dialog system may have multiple mechanisms for how to deal with ambiguous intents, such as servicing all or subset of the intents, confirming the right subset with the user, or branching out of an active intent (with or without confirmation) and returning back (with or without confirmation). As such, to efficiently process dialog system inputs containing a series of multiple ambiguous intents, and make a decision among several context-dependent options, typical dialog systems require large numbers of granular rules by a dialog designer and a subject matter expert to be able to process the dialog system input and generate appropriate dialog that is responsive to each intent. Described embodiments do not rely upon large granular rule sets for each individual intent, but rather employ a set of generic rules, as will be described in greater detail below in connection with step 208.

Next, at 206, data processing program 150 may, in response to identifying the series of ambiguous intents, determine, based on an accessible domain model, one or more relevant annotated themes corresponding to each individual intent within the series of ambiguous intents. In embodiments, the accessible domain model may include a series of annotated intent themes grouped into logically linked connections. In embodiments, the logically linked connections may be based on a given business domain and associated business rules. For example, an exemplary accessible domain model may include an exemplary annotated theme 'travel' that may be associated with a series of individual intents such as, for example, 'book flight', 'book hotel', 'book train', 'book taxi', etc. In embodiments, the domain model may be configured to include temporal annotated themes configured to link individual intents within a given temporary (temporal) theme and then subsequently remove the temporary theme when it is no longer applicable. In embodiments, the annotated themes and relationships may be provided by a dialog system designer, or automatically recommended to the designer and applied after designer approval.

In embodiments, data processing program 150 may leverage the accessible domain model to automatically recognize or identify the relevant annotated themes corresponding to each individual intent within the identified series of ambiguous intents. To automatically identify the most applicable annotated themes corresponding to the intents, the accessible domain model may leverage suitable known clustering techniques to model intents based on generated intent-clusters. In embodiments, the accessible domain model may further be configured to extracts groups of intents from accessible (historical) logs that have frequently been covered in single or adjacent conversation sessions by users. In embodiments, the accessible domain model may further, for actions that execute Application Programming Interfaces (APIs), establish dependencies between actions' intents based on dependencies between APIs (e.g., if output of one API is consumed as an input by another API). In one embodiment, the accessible domain model may utilize Large Language Models (LLMs) to leverage intent-clusters, intent-sequences, and frequent-intent-groups. In embodiments, the accessible domain model may further combine intent-clusters, intent-sequences (based on inferred API dependencies), and frequent-intent groups (from the accessible logs) to more accurately determine which annotated themes are most strongly associated with each individual intent. In another embodiment, the utilized LLM may be used to infer dependencies between API invoking actions. Data processing program 150 may be configured to allow a designer to accept, reject, modify, or apply a series of automatically recognized themes (based on the above-described actions) via a suitable user interface. In embodiments, data processing program 150 may be configured to ensure the accessible domain model and the dialog system store, within a suitable storage system, accessible logs including data related to historical generated dialogs and intents contained therein. Thus, data processing program 150 ensures that the accessible domain model may automatically recognize relevant annotated themes with increased confidence over time as more dialog data is gathered by the dialog system. Accordingly, the dialog system employing data processing program 150 and leveraging the improved domain model will also become more efficient and versatile. Once data processing program 150 has determined, based on the accessible domain model, one or more relevant annotated themes corresponding to each individual intent within the series of ambiguous intents, the data corresponding to the dialog system input may be further processed to generate a dialog using a set of generic rules that leverage the relevant annotated themes. This process will be described below in connection with step 208.

At 208, data processing program 150 may execute, using the dialog system, a dialog corresponding to the received dialog system input by employing a set of generic rules, wherein the set of generic rules leverage the identified relevant annotated themes. In embodiments, the generic rules may include any out-of-the-box default rules employed at a system level. For example, data processing program 150 may be configured to use the dialog system to employ an exemplary set of generic rules at a system level with the following exemplary conditions (rules) based on the relevant annotated themes: "If multiple intents are detected, and all of them are in a single theme, then use relationships (if any) to sequence and execute each (tracking to closure). In absence of relationship, if close semantic similarity between intents, then disambiguate with user, otherwise, execute all intents, one by one. Inform the user, as the conversation moves from one intent to the other. If multiple intents are detected, and 2 or more belong to a theme, then; Prefer to execute the intents that are part of a common theme. Consult the user to ask if the out of theme intent should be executed or skipped. If a single intent is detected, and it is a component of a composite-intent in a theme, then; Execute the intent (or check/suggest a pre-requisite (if any) from the composite-intent). Recommend or suggest other intents from the theme. If a single intent is detected, and it is a composite-intent in a theme, then; Execute its children as well, observing the order (if any) suggested by relationships."

The above-described exemplary set of generic rules demonstrates how a dialog system employing data processing program 150 may leverage a domain-model and the annotated themes contained therein. Rather than requiring a large number of granular rules for each dialog flow and branch, the domain model employing data processing program 150 may rely upon a simpler set of generic rules to leverage the annotated themes within the accessible domain model to be able to process dialog system inputs including multiple ambiguous intents. In embodiments, leveraging exemplary generic rule sets (similarly to as described in the above example) allows dialog systems employing data processing program 150 to efficiently prioritize and sequence multiple ambiguous intents based on the rules. The set of generic rules employed by a dialog system using data processing program 150 for prioritizing and sequencing multiple ambiguous intents may provide a variety of benefits and uses. In embodiments, users often want to input and obtain responses for multiple intents (from the theme) within a single conversation session. For example, a user planning a trip often wants to book flights, hotels, and maybe more. Described embodiments further improve the versatility of dialog systems employing data processing program 150 as it allows designers of dialog systems to confidently rely on out-of-the-box generic rules that allow for improved recommendations for other remaining intents that may not have been included within the original dialog system input, but instead are derived from a relevant theme, and may be used as follow-up conversations for after a conversation for the originally received intents within the received dialog system input (from a theme) completes. In embodiments, designers of dialog systems employing data processing program 150 may leverage an annotated theme to model campaigns, bundles, or promotions, such that all or at least some mandatory actions within the bundle must be tracked by the assistant to deliver a benefit. As described previously, in other embodiments, while processing multiple intents, the annotated themes may be leveraged by the dialog system employing data processing program 150 to prioritize or sequence the conversations. For example, in the previous sample with intents corresponding to flight (0.9), hotel (0.5), and reset-password (0.8), the assistant may want to sequence hotel booking conversation right after the completion of the flight booking conversation (due to the shared theme), despite the confidence for reset-password intent being higher than the hotel intent.

It may be appreciated that data processing program 150 has thus provided improved domain model driven processing of dialog system inputs including ambiguous intents. Described embodiments leverage domain models of the intents to empower sets of generic rules that may functionally guide a given dialog system to generate improved conversation experiences for customers by simplifying decisions about disambiguation, digression, and recommending of follow-up conversations in response to receiving dialog system inputs including multiple or linked intents. The themes within the domain model may include relationships, features, dependencies, co-occurrences, and other useful data associated with intents sharing a theme. This allows described embodiments to provide for additional versatility by providing for dialog systems that may engage in generating dialog including recommended follow-up questions while continuously storing conversational data to improve the accuracy and efficiency of the leveraged themes within the domain model. By identifying themes within an accessible domain model that correspond to multiple ambiguous intents of a given dialog system input, described embodiments thus allow for dialog systems that do not require large amounts of granular rules for handling multiple intents, but can instead leverage a simple, and more universal set of generic rules.

Presently described embodiments may relate to the following clauses:

Clause 1: A computer-based method for domain model driven processing of dialog system inputs including ambiguous intents, the method including: receiving a dialog system input for processing by a dialog system, identifying a series of ambiguous intents within the received dialog system input, in response to identifying the series of ambiguous intents, determining, based on an accessible domain model, one or more relevant annotated themes corresponding to each individual intent within the series of ambiguous intents, and executing, using the dialog system, a dialog corresponding to the received dialog system input by employing a set of generic rules, wherein the set of generic rules leverage the identified relevant annotated themes. Described methods leverage domain models that include relationships, features, dependencies, co-occurrences, and other useful data associated with intents sharing a theme. By identifying themes within an accessible domain model that correspond to multiple ambiguous intents of a given dialog system input, described methods thus allow for dialog systems that do not require large amounts of granular rules for handling multiple intents, but can instead leverage a simple, and more universal set of generic rules.

Clause 2: The computer-based method of clause 1, where the dialog system input comprises one or more of a textual communication, an utterance, and a non-verbal communication that may be converted into an associated textual communication. Thus, described embodiments may be employed with dialog systems or chatbots having a wide variety of natural language processing tools and features for receiving dialog system inputs in various forms that may be processed and leveraged by described embodiments to handle multiple ambiguous intents contained therein, making the dialog system or chatbot more versatile by employing described embodiments.

Clause 3: The computer-based method of any of the preceding clauses 1-2, where the dialog system includes at least one of a chatbot, a virtual agent, and an algorithm or machine-learning driven software tool for generating dialog in response to the received dialog system input. Described embodiments may thus be employed within multiple types of environments, applications, or other technological solutions in which dialog is generated in response to received dialog system inputs.

Clause 4: The computer-based method of any of the preceding clauses 1-3, further including determining the one or more relevant annotated themes corresponding to each individual intent within the series of ambiguous intents may further include utilizing a large language model to leverage at least one of intent-clusters, intent-sequences, and frequent-intent-groups based on accessible logs of historical dialogs. This allows described embodiments to more accurately determine which annotated themes are most strongly associated with each individual intent based on historical data, as well as the received dialog system input.

Clause 5: The computer-based method of any of the preceding clauses 1-4, where the set of generic rules includes instructions for prioritizing and sequencing the series of multiple ambiguous intents. The instructions for prioritizing and sequencing the series of multiple ambiguous intents may allow for obtaining of information in a specific order, or related to specific associated intents, such that a dialog system employing described embodiments may more efficiently generate responsive dialog. Sequencing of ambiguous intents may allow for more versatility in recommending follow-up dialog which may be related to intents that are typically answered by users with similar intents within a single conversation or session.

Clause 6: The computer-based method of any of the preceding clauses 1-5, where the set of generic rules is configured to cause the dialog system to execute one or more remaining intents from the one or more relevant annotated themes as part of a follow-up dialog. This provides for improved dialog generation for received dialog inputs corresponding to a specific domain having an annotated theme which includes a series of additional relevant intents that may not have been included in the received dialog system input.

Clause 7: The computer-based method of any of the preceding clauses 1-6, where the large language model further infers dependencies between Application Programming Interface (API) invoking actions. This allows described embodiments to more accurately determine which annotated themes are most strongly associated with each individual intent by considering additional data.

Clause 8: A computer system, the computer system including: one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method including: receiving a dialog system input for processing by a dialog system, identifying a series of ambiguous intents within the received dialog system input, in response to identifying the series of ambiguous intents, determining, based on an accessible domain model, one or more relevant annotated themes corresponding to each individual intent within the series of ambiguous intents, and executing, using the dialog system, a dialog corresponding to the received dialog system input by employing a set of generic rules, wherein the set of generic rules leverage the identified relevant annotated themes. Described embodiments provide a computer system which may leverage domain models that include relationships, features, dependencies, co-occurrences, and other useful data associated with intents sharing a theme. By identifying themes within an accessible domain model that correspond to multiple ambiguous intents of a given dialog system input, described methods thus allow for dialog systems that do not require large amounts of granular rules for handling multiple intents, but can instead leverage a simple, and more universal set of generic rules.

Clause 9: The computer system of clause 8, where the dialog system input includes one or more of a textual communication, an utterance, and a non-verbal communication that may be converted into an associated textual communication. Thus, described embodiments may be employed with dialog systems or chatbots having a wide variety of natural language processing tools and features for receiving dialog system inputs in various forms that may be processed and leveraged by described embodiments to handle multiple ambiguous intents contained therein, making the dialog system or chatbot more versatile by employing described embodiments.

Clause 10: The computer system of any of the preceding clauses 8-9, where the dialog system includes at least one of a chatbot, a virtual agent, and an algorithm or machine-learning driven software tool for generating dialog in response to the received dialog system input. Described embodiments may thus be employed within multiple types of environments, applications, or other technological solutions in which dialog is generated in response to received dialog system inputs.

Clause 11: The computer system of any of the preceding clauses 8-10, the performed method further including determining the one or more relevant annotated themes corresponding to each individual intent within the series of ambiguous intents may further include utilizing a large language model to leverage at least one of intent-clusters, intent-sequences, and frequent-intent-groups based on accessible logs of historical dialogs. This allows described embodiments to more accurately determine which annotated themes are most strongly associated with each individual intent based on historical data, as well as the received dialog system input.

Clause 12: The computer system of any of the preceding clauses 8-11, where the set of generic rules includes instructions for prioritizing and sequencing the series of multiple ambiguous intents. The instructions for prioritizing and sequencing the series of multiple ambiguous intents may allow for obtaining of information in a specific order, or related to specific associated intents, such that a dialog system employing described embodiments may more efficiently generate responsive dialog. Sequencing of ambiguous intents may allow for more versatility in recommending follow-up dialog which may be related to intents that are typically answered by users with similar intents within a single conversation or session.

Clause 13: The computer system of any of the preceding clauses 8-12, where the set of generic rules is configured to cause the dialog system to execute one or more remaining intents from the one or more relevant annotated themes as part of a follow-up dialog. This provides for improved dialog generation for received dialog inputs corresponding to a specific domain having an annotated theme which includes a series of additional relevant intents that may not have been included in the received dialog system input.

Clause 14: The computer system of any of the preceding clauses 8-13, where the large language model further infers dependencies between Application Programming Interface (API) invoking actions. This allows described embodiments to more accurately determine which annotated themes are most strongly associated with each individual intent by considering additional data.

Clause 15: A computer program product, the computer program product including: one or more computer-readable tangible storage medium and program instructions stored on at least one of the one or more computer-readable tangible storage medium, the program instructions executable by a processor capable of performing a method, the method including: receiving a dialog system input for processing by a dialog system, identifying a series of ambiguous intents within the received dialog system input, in response to identifying the series of ambiguous intents, determining, based on an accessible domain model, one or more relevant annotated themes corresponding to each individual intent within the series of ambiguous intents, and executing, using the dialog system, a dialog corresponding to the received dialog system input by employing a set of generic rules, wherein the set of generic rules leverage the identified relevant annotated themes. Described embodiments provide a computer program product which may leverage domain models that include relationships, features, dependencies, co-occurrences, and other useful data associated with intents sharing a theme. By identifying themes within an accessible domain model that correspond to multiple ambiguous intents of a given dialog system input, described methods thus allow for dialog systems that do not require large amounts of granular rules for handling multiple intents, but can instead leverage a simple, and more universal set of generic rules.

Clause 16: The computer program product of clause 15, where the dialog system input includes one or more of a textual communication, an utterance, and a non-verbal communication that may be converted into an associated textual communication. Thus, described embodiments may be employed with dialog systems or chatbots having a wide variety of natural language processing tools and features for receiving dialog system inputs in various forms that may be processed and leveraged by described embodiments to handle multiple ambiguous intents contained therein, making the dialog system or chatbot more versatile by employing described embodiments.

Clause 17: The computer program product of any of the preceding clauses 15-16, where the dialog system includes at least one of a chatbot, a virtual agent, and an algorithm or machine-learning driven software tool for generating dialog in response to the received dialog system input. Described embodiments may thus be employed within multiple types of environments, applications, or other technological solutions in which dialog is generated in response to received dialog system inputs.

Clause 18: The computer program product of any of the preceding clauses 15-17, the performed method further including determining the one or more relevant annotated themes corresponding to each individual intent within the series of ambiguous intents may further include utilizing a large language model to leverage at least one of intent-clusters, intent-sequences, and frequent-intent-groups based on accessible logs of historical dialogs. This allows described embodiments to more accurately determine which annotated themes are most strongly associated with each individual intent based on historical data, as well as the received dialog system input.

Clause 19: The computer program product of any of the preceding clauses 15-18, where the set of generic rules includes instructions for prioritizing and sequencing the series of multiple ambiguous intents. The instructions for prioritizing and sequencing the series of multiple ambiguous intents may allow for obtaining of information in a specific order, or related to specific associated intents, such that a dialog system employing described embodiments may more efficiently generate responsive dialog. Sequencing of ambiguous intents may allow for more versatility in recommending follow-up dialog which may be related to intents that are typically answered by users with similar intents within a single conversation or session.

Clause 20: The computer program product of any of the preceding clauses 15-19, where the set of generic rules is configured to cause the dialog system to execute one or more remaining intents from the one or more relevant annotated themes as part of a follow-up dialog. This provides for improved dialog generation for received dialog inputs corresponding to a specific domain having an annotated theme which includes a series of additional relevant intents that may not have been included in the received dialog system input.

It may be appreciated that FIG. 2 provides only illustrations of an exemplary implementation and does not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving a dialog system input for processing by a dialog system;

identifying a series of ambiguous intents within the dialog system input;

in response to identifying the series of the ambiguous intents, determining, based on an accessible domain model, one or more relevant annotated themes corresponding to each individual intent within the series of the ambiguous intents, wherein a first relevant annotated theme from the one or more relevant annotated themes include a temporal annotated theme that links a first individual intent with a temporary theme;

executing, using the dialog system, a plurality of conversations corresponding to the dialog system input by employing a set of generic rules, wherein the executing includes:

prioritizing the series of the ambiguous intents based on the set of generic rules that leverage the one or more relevant annotated themes corresponding to each individual intent within the series of the ambiguous intents; and sequencing, based on the prioritizing, the plurality of conversations corresponding to the dialog system input; and removing, when no longer applicable, the temporary theme from the first individual intent.

2. The method of claim 1, wherein the dialog system input comprises one or more of a textual communication, an utterance, and a non-verbal communication that is convertible into an associated textual communication.

3. The method of claim 1, wherein the dialog system comprises at least one of a chatbot, a virtual agent, and an algorithm or machine-learning driven software tool for generating dialog in response to the dialog system input.

4. The method of claim 1, wherein the determining the one or more relevant annotated themes corresponding to each individual intent within the series of the ambiguous intents comprises:

utilizing a large language model to leverage at least one of intent-clusters, intent-sequences, and frequent-intent-groups based on accessible logs of historical dialogs.

5. The method of claim 4, wherein the large language model further infers dependencies between Application Programming Interface (API) invoking actions.

6. The method of claim 1, further comprising:

executing one or more remaining intents from the one or more relevant annotated themes as part of a follow-up dialog.

7. A computer system comprising:

a processor set;

one or more computer readable storage media; and program instructions stored on the one or more computer readable storage media to cause the processor set to perform operations comprising:

receiving a dialog system input for processing by a dialog system;

identifying a series of ambiguous intents within the dialog system input;

in response to identifying the series of the ambiguous intents, determining, based on an accessible domain model, one or more relevant annotated themes corresponding to each individual intent within the series of the ambiguous intents, wherein a first relevant annotated theme from the one or more relevant annotated themes include a temporal annotated theme that links a first individual intent with a temporary theme;

executing, using the dialog system, a plurality of conversations corresponding to the dialog system input by employing a set of generic rules, wherein the executing includes:

prioritizing the series of the ambiguous intents based on the set of generic rules that leverage the one or more relevant annotated themes corresponding to each individual intent within the series of the ambiguous intents; and sequencing, based on the prioritizing, the plurality of conversations corresponding to the dialog system input; and removing, when no longer applicable, the temporary theme from the first individual intent.

8. The computer system of claim 7, wherein the dialog system input comprises one or more of a textual communication, an utterance, and a non-verbal communication that is convertible into an associated textual communication.

9. The computer system of claim 7, wherein the dialog system comprises wherein the dialog system comprises at least one of a chatbot, a virtual agent, and an algorithm or machine-learning driven software tool for generating dialog in response to the dialog system input.

10. The computer system of claim 7, wherein the determining the one or more relevant annotated themes corresponding to each individual intent within the series of the ambiguous intents comprises:

utilizing a large language model to leverage at least one of intent-clusters, intent-sequences, and frequent-intent-groups based on accessible logs of historical dialogs.

11. The computer system of claim 10, wherein the large language model further infers dependencies between Application Programming Interface (API) invoking actions.

12. The computer system of claim 7, wherein the operations further comprise:

executing one or more remaining intents from the one or more relevant annotated themes as part of a follow-up dialog.

13. A computer program product comprising:

one or more computer readable storage media; and program instructions stored on the one or more computer readable storage media to perform operations comprising:

receiving a dialog system input for processing by a dialog system;

identifying a series of ambiguous intents within the dialog system input;

in response to identifying the series of the ambiguous intents, determining, based on an accessible domain model, one or more relevant annotated themes corresponding to each individual intent within the series of the ambiguous intents, wherein a first relevant annotated theme from the one or more relevant annotated themes include a temporal annotated theme that links a first individual intent with a temporary theme;

executing, using the dialog system, a plurality of conversations corresponding to the dialog system input by employing a set of generic rules, wherein the executing includes:

prioritizing the series of the ambiguous intents based on the set of generic rules that leverage the one or more relevant annotated themes corresponding to each individual intent within the series of the ambiguous intents; and sequencing, based on the prioritizing, the plurality of conversations corresponding to the dialog system input; and removing, when no longer applicable, the temporary theme from the first individual intent.

14. The computer program product of claim 13, wherein the dialog system input comprises one or more of a textual communication, an utterance, and a non-verbal communication that is convertible into an associated textual communication.

15. The computer program product of claim 13, wherein the dialog system comprises wherein the dialog system comprises at least one of a chatbot, a virtual agent, and an algorithm or machine-learning driven software tool for generating dialog in response to the dialog system input.

16. The computer program product of claim 13, wherein the determining the one or more relevant annotated themes corresponding to each individual intent within the series of the ambiguous intents comprises:

utilizing a large language model to leverage at least one of intent-clusters, intent-sequences, and frequent-intent-groups based on accessible logs of historical dialogs.

17. The computer program product of claim 16, wherein the large language model further infers dependencies between Application Programming Interface (API) invoking actions.

18. The computer program product of claim 13, wherein wherein the operations further comprise:

executing one or more remaining intents from the one or more relevant annotated themes as part of a follow-up dialog.

* * * * *